(12) United States Patent
Mon

(10) Patent No.: US 11,424,604 B1
(45) Date of Patent: Aug. 23, 2022

(54) FLUSH WALLPLATE ELECTRICAL BOX ASSEMBLY

(71) Applicant: George Emmanuel Mon, Ladera Ranch, CA (US)

(72) Inventor: George Emmanuel Mon, Ladera Ranch, CA (US)

( * ) Notice: Subject to any disclaimer, the term of this patent is extended or adjusted under 35 U.S.C. 154(b) by 0 days.

(21) Appl. No.: 17/723,176

(22) Filed: Apr. 18, 2022

Related U.S. Application Data

(63) Continuation-in-part of application No. 17/493,558, filed on Oct. 4, 2021.

(51) Int. Cl.
*H02G 3/12* (2006.01)
*H02G 3/14* (2006.01)

(52) U.S. Cl.
CPC ............... *H02G 3/12* (2013.01); *H02G 3/14* (2013.01)

(58) Field of Classification Search
CPC .. H02G 3/12; H02G 3/14; H02G 3/08; H02G 3/081; H02G 3/088; H02G 3/10; H02G 3/123; H05K 5/00; H05K 5/02; H05K 5/0217; H05K 5/03
USPC .. 174/66, 67, 50, 53, 57, 58, 480, 481, 502, 174/535; 220/3.2–3.9, 4.02, 241, 242; 248/906, 343
See application file for complete search history.

(56) References Cited

U.S. PATENT DOCUMENTS

| | | | | |
|---|---|---|---|---|
| 6,239,365 B1* | 5/2001 | McEvers | ............... | H02G 3/123 29/854 |
| 6,908,003 B2* | 6/2005 | Feyes | .................... | H02G 3/088 174/53 |
| 7,378,591 B2* | 5/2008 | Dinh | ..................... | H02G 3/086 220/3.6 |
| 7,388,162 B1* | 6/2008 | Gretz | ..................... | H02G 3/121 174/53 |
| 7,501,575 B2* | 3/2009 | Jolly | ..................... | H02G 3/121 174/53 |
| 8,445,779 B1* | 5/2013 | Gretz | ..................... | H02G 3/123 174/53 |
| 8,686,287 B1* | 4/2014 | Gretz | ..................... | H02G 3/123 439/535 |
| 8,933,331 B1* | 1/2015 | Gretz | ....................... | E04B 2/00 174/53 |
| 9,018,524 B2* | 4/2015 | Dinh | ..................... | H02G 3/088 174/505 |
| 9,035,177 B1* | 5/2015 | Gretz | ..................... | H02G 3/121 174/50 |

(Continued)

*Primary Examiner* — Angel R Estrada

(57) ABSTRACT

The Flush Wallplate Electrical Box Assembly deploys and constrains an electrical wallplate such that the wallplate finished face is essentially co-planar to the surrounding wall assembly finish material finished surface. The assembly is comprised of flush wallplate electrical box possessing an integral housing intended to receive the electrical wallplate, an interface flange serving to interface between the electrical box and wall assembly finish materials, an interface placement guide to control the positioning of the interface flange and an element to protect wiring inside the electrical box during wall assembly construction. The form of the electrical box provides for a building and electrical code compliant installation and simplifies box positioning providing minimum variability. The interface flange provides for a consistent termination of wall assembly materials at the periphery of the electrical box.

20 Claims, 14 Drawing Sheets

(56) References Cited

U.S. PATENT DOCUMENTS

2022/0140586 A1* 5/2022 Pike .................. H02G 3/12
220/3.8

* cited by examiner

FLUSH WALLPLATE ELECTRICAL BOX ASSEMBLY

CROSS REFERENCE TO RELATED PATENT APPLICATIONS

This application claims the benefit of U.S. Non-Provisional Utility patent application Ser. No. 17/493,558 filed Oct. 4 2021 by George E. Mon as sole inventor, the contents of which are incorporated herein by reference in its entirety.

FIELD OF THE INVENTION

The present invention relates to electrical boxes used in new and old work type electrical installations and specifically regards the manner in which these boxes interface with elements of the installation including outlets, wallplates, and wall assembly construction materials.

BACKGROUND OF THE INVENTION

Electrical enclosures, otherwise known as electrical boxes, are required by National Electrical Code for handling cable and connecting receptacles and switches to conductors in wall assemblies. They are generally of different types designed to be used in new or existing construction and to accommodate various quantities of cabling and outlets.

Devices such as receptacles and switches are installed at these boxes and are covered by wallplates to prevent building occupant exposure to electrical components and to provide an interface between the devices and the wall assemblies surrounding them. Historically, the wallplates are placed with their finish face co-planar with the outlet finish face and their non-face side co-planar and partially covering the adjacent wall surface such as wallboard. Additionally, the wallplates were attached to the outlet with small standard machine screws.

Installations where the wallplate face and electrical outlet are placed co-planar to the adjacent wall surface—that is, a flush wallplate installation are contemplated. These installations, however, may require that the electrical box be placed at a non-standard depth relative to framing which can result in non-compliance with electrical codes.

Furthermore, new energy codes used throughout North America require decreased air flow through wall and ceiling assemblies including at these electrical boxes for compliance. As such, the interface between the electrical box and other components needs to be designed to minimize this airflow.

Lastly, the design of electrical boxes should not disrupt typical construction methods including those of wallboard installers and finishers.

Accordingly, an electrical box assembly which allows for code compliant flush wallplate installations while minimizing labor required during electrical installation, without additional cutting or templating around the box, and which provides decreased air flow at the wall assembly is desired.

Reference: H02G/3/08; H02G 3/086; H02G 3/10; H02G 3/12; H02G 3/121; H02G 3/14

SUMMARY OF THE INVENTION

The Flush Wallplate Electrical Box Assembly consists of four basic constituents: the flush wallplate electrical box, the wiring protection plate, the finish material interface flange, and lastly the finish material interface flange placement guide.

The flush wallplate electrical box is an electrical box with an integrally joined housing intended to receive an electrical wallplate with its finish face co-planar with the wall assembly finish material. It has the following primary characteristics: 1) a form which provides for placement of the box adjacent to wall assembly components in an electrical code compliant manner; 2) an element which assists electricians or other box installers with precise and proper box placement against framing members without measuring for box depth; 3) elements which serve as a guide for cut out or route around the box without the use of supplemental templates in wallboard wall assemblies.

The wiring protection plate serves to protect cabling and other wiring during installation of wall assembly finish materials.

The finish material interface flange provides an interface between the flush wallplate electrical box and wall assembly finish materials and additionally allows for increased wall assembly air sealing at the box. The finish material interface flange placement guide assists installers in proper placement of the interface flange.

Further describing these assembly constituents: the flush wallplate electrical box, hereafter referred to simply as the FWE box, has a wallplate housing portion which consists of a series of integrally connected portions which provide for flush wallplate installations in an electrical code compliant manner. It can be used for both new and old work type installations.

Electrical codes and specifically the National Electric Code specify that electrical boxes must serve to isolate wiring and other electrical components from adjacent wall assembly materials with specific dimensional tolerances.

To quote from both the 2017 and 2020 NFPA 70, the National Electric Code, "314.20 Flush-Mounted Installations. Installations within or behind a surface of concrete, tile, gypsum, plaster, or other noncombustible material, including boxes employing a flushtype cover or faceplate, shall be made so that the front edge of the box, plaster ring, extension ring, or listed extender will not be set back of the finished surface more than 6 mm (1/4 in.)."

Typical box/outlet installations employ surface mounted wallplates, which is to say the back of the wallplate is aligned with the wall finish material. These types of installations meet NEC Code criterion by aligning the open face of a typical electrical box with the surface of the finish material. In contrast, installations that propose to place the wallplate finish face flush with the wall surface require that the electrical box be set back from the finish face of wall material by the depth of the wallplate plus the depth of any elements that interface with the wallplate plus a small margin to allow for outlet adjustment. A typical electrical box set back in the manner of this later installation is not, therefore, NEC 314.20 compliant. The FWE box corrects this problem.

Of note is the fact that the FWE Box housing accommodates most standard size wallplates and screwless wallplates and the box body itself accommodates standard outlets such as receptacles and switches. Because these screwless wallplates require an attachment portion known as a subplate, the required depth and the depth that the FWE Box housing provides is the depth of the wallplate, subplate and a small margin for adjustment. As standard wallplates dimensions overhang the box face in a dissimilar manner on the longitudinal and transverse sides, the proportions of housing will follow the wallplate and not the box body.

Neither the wallplate, subplate or any outlet is a part of this application. Rather the presented Flush Wallplate Electrical Box Assembly interfaces with standard electrical components from most any electrical device manufacturer and provides a code compliant installation of same in typical construction assemblies.

After FWE Box placement and installation of wiring but before placement of outlets, the presented wiring protection plate is optionally placed in the wallplate housing to protect wiring from wallboard router bits during wallboard installation. This is especially important for circuits protected by AFCI receptacles or circuit breakers as small amounts of damage to wiring can cause arc fault signals.

The FWE Box can optionally be paired with a finish material interface flange. The interface flange is formed in proportions that would permit nested placement inside of the FWE box wallplate housing. The interface flange serves to facilitate wall assembly construction around the FWE box particularly where the wall assembly finish material is gypsum wallboard. The flange further provides a surface of similar materials and thus appearance to that of the wallplate in the area between the FWE box and wall assembly.

For wall, ceiling and floor installations where the FWE box abuts wood, tile or materials other than wallboard, the interface flange can be omitted and optionally replaced by trim pieces mitered and placed in a code compliant manner. Typically, this would involve placing trim materials on the finish side of the FWE box wallplate portion and of such dimension as to comply with NEC 314.20. This arrangement would be especially advantageous in floor installations in that the faceplate would be at or below the face of the finish floor providing for a level floor surface.

The finish material interface flange additionally serves as a substrate for placement of foam sealing tapes or gaskets which together with the FWE box and interface flange provide for exceptionally tight air sealing. This flange sealing method also eliminates the use of time consuming, messy and laborious putties or spray foam in the wallboard cutout area.

The structures, proportions and configurations presented can be implemented in single, double, multi "gang" and round box embodiments. The structures, proportions and configurations can also be used to provide electrical boxes for exterior electrical installations.

DETAILED DESCRIPTION OF THE PREFERRED EMBODIMENTS

Figure 1:
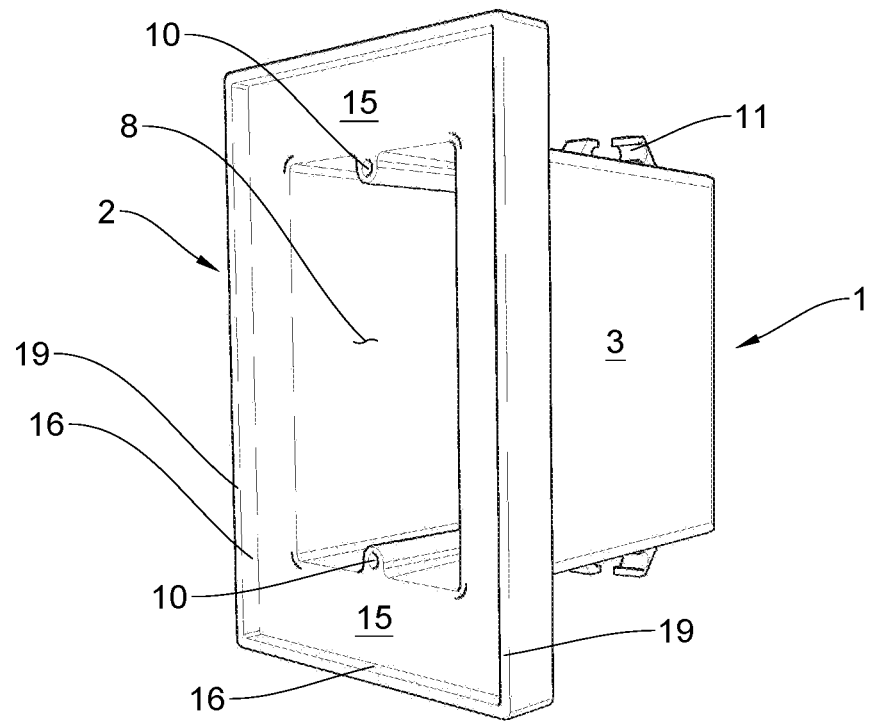
FIG. 1 is a perspective view of the flush wallplate electrical box longitudinal side and front.
Figure 2:
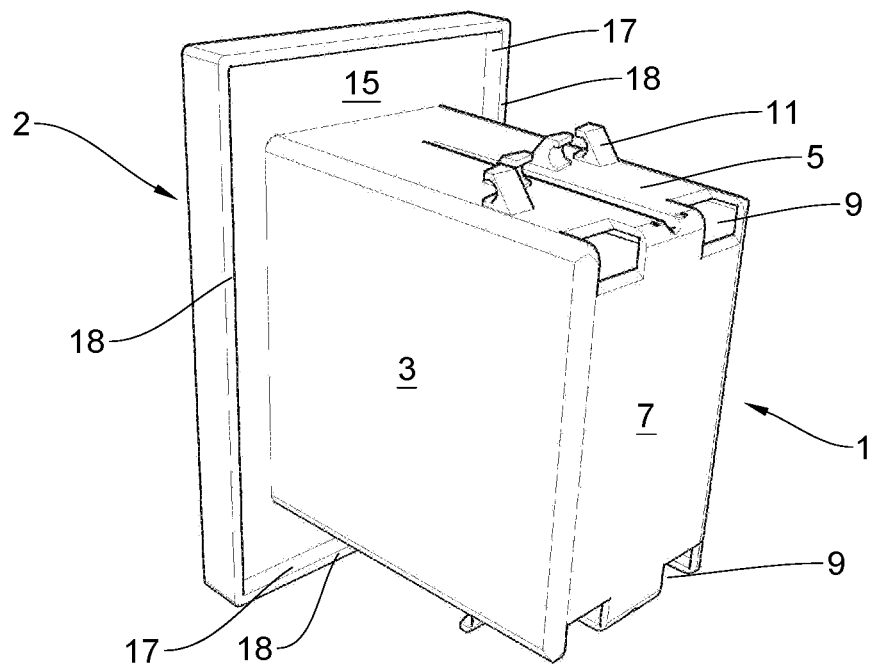
FIG. 2 is a perspective view of the flush wallplate electrical box longitudinal side and back.
Figure 3:
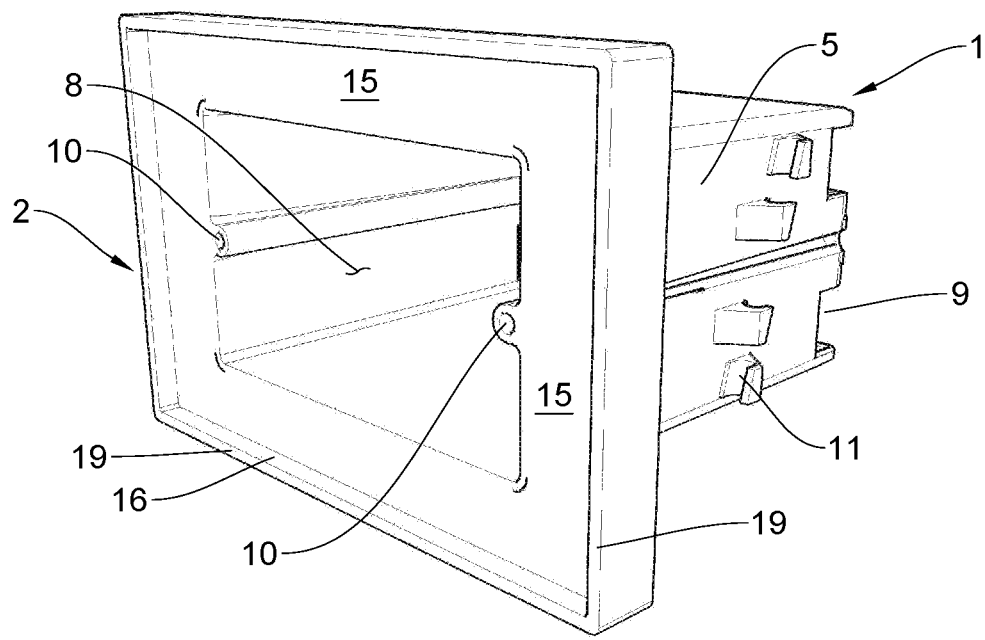
FIG. 3 is a perspective view of the flush wallplate electrical box transverse side and front.
Figure 4:
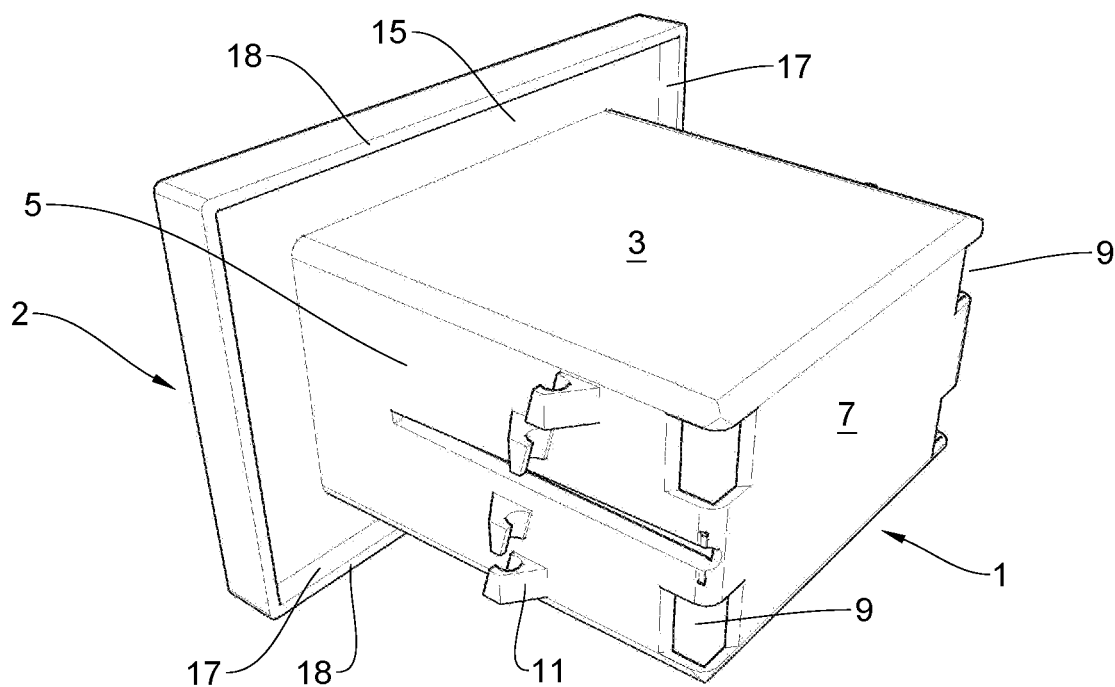
FIG. 4 is a perspective view of the flush wallplate electrical box transverse side and back.

Referring to FIGS. 1-4: The flush wallplate electrical box preferred embodiment is an electrical box body (1) and flush wallplate housing (2) presented as a unitary structure. The electrical box body has four sides portions (3, 4, 5, 6) and a rectangular back portion (7) all formed together where they meet and with the front face (8) open (rectangular boxes) or a cylindrical shape and substantially round back portion formed together where they meet with the front face open (round boxes). The box body can be fastened to framing with standard fasteners placed through optional fastener clips (11) or openings described later in this detailed description. Within the box body are features such as knockouts or other types of openings (9) which enable cabling to enter and in some instances be secured, and threaded recesses (10) for receptacle and switch yokes to be mounted to the box using screws. Knock out tabs or other types of openings are, in some instances, sealed after electrical work. The box body may be capable of receiving devices such as clamps or grommets to assist in securing and protecting the cable.

The FWE box wallplate housing (2) is comprised of three portions: one co-planar portion (15) at the entire periphery of the open face of the box body, a wallplate portion (16) integrally connected to and orthogonal to the co-planar portion and, lastly, a calibration portion (17) also integrally formed and orthogonal to the co-planar portion and oppositely arranged to the wallplate portion. Together the three FWE Box housing portions provide the code required front edge of box criteria outlined in NEC 314.20. Specifically, with the calibration portion rear edge (18) placed against the finish material side of framing, the wallplate portion forward edge (19) extends to within the NEC 314.20 tolerance for distance to the finish face of the wall assembly. The FWE box body (1) can now be set back from the finish face of wall materials so as to accommodate the flush wallplate and subplate while meeting 314.20 code. The electrical installation complies with 314.20 regardless of how the FWE box interfaces with the wall assembly. A more detailed description of these housing portion dimensions follows later in this section.

If the wall assembly finish material is wallboard, the FWE box and, more precisely, the housing portions orthogonal to the co-planar flange portion together serve as a template for wallboard installers to route against during wallboard installation thus eliminating the need for any supplemental measuring, templating devices or the labor required to install them. To further explain: a standard electrical box cutout leaves an opening too small for flush wallplate type installations. As such, after the standard box installation, a non-standard cut is required around the box to accommodate the wallplate and any supplemental box extensions. The FWE box corrects this by serving as its own template. As virtually all wallboard installers now use powered routers to cut around electrical boxes during wallboard installation, the FWE box housing portions serve as guide for the router and thus the router bit allowing the installer to more precisely and quickly follow the outline of the box resulting in more precise openings. With the FWE box, the order and manner of construction is as with typical electrical box and wallboard installations but now accommodating the flush wallplate.

Figure 5:
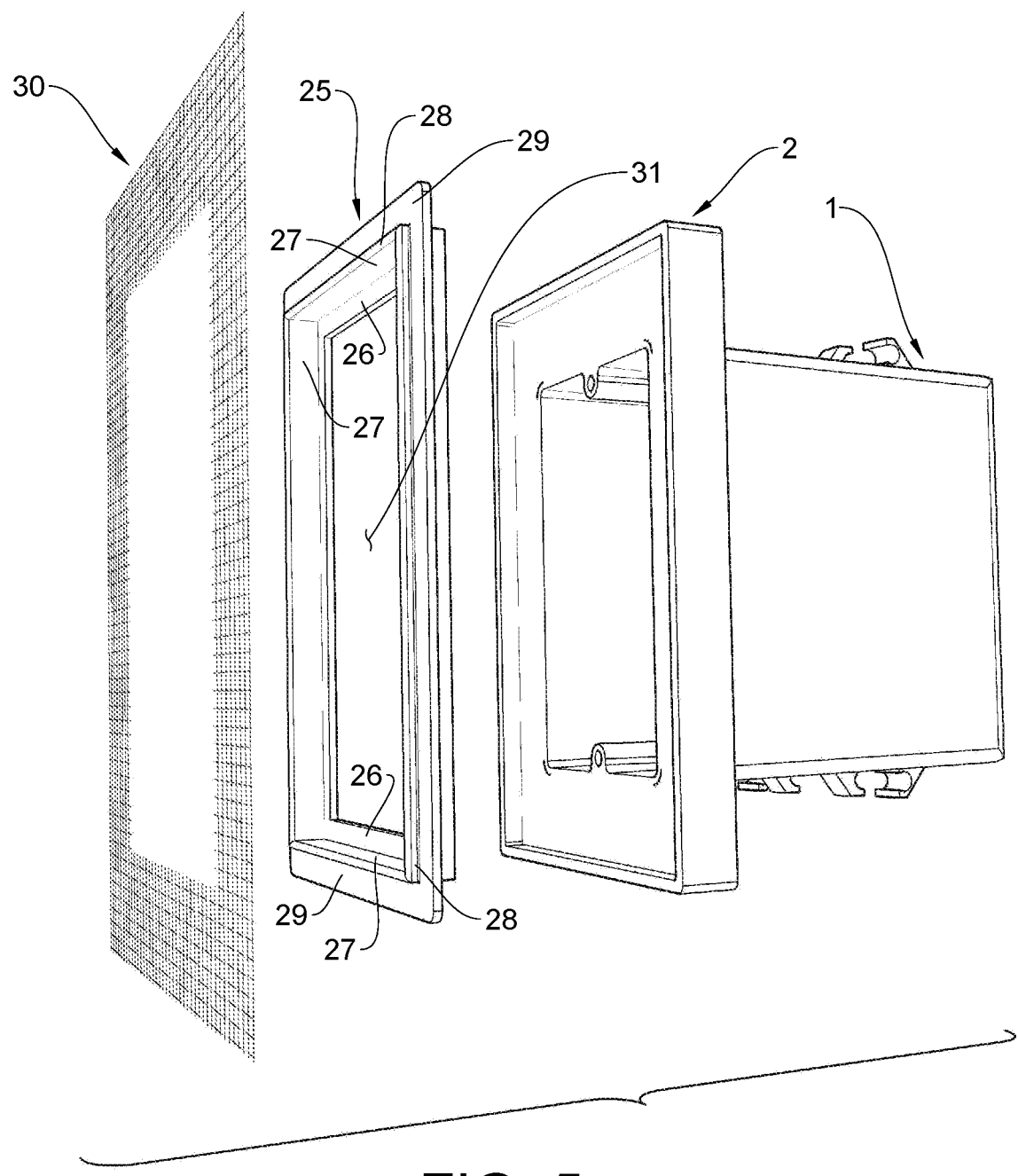
FIG. 5 is an exploded perspective view of the flush wallplate electrical box and finish material interface flange.
Figure 6:
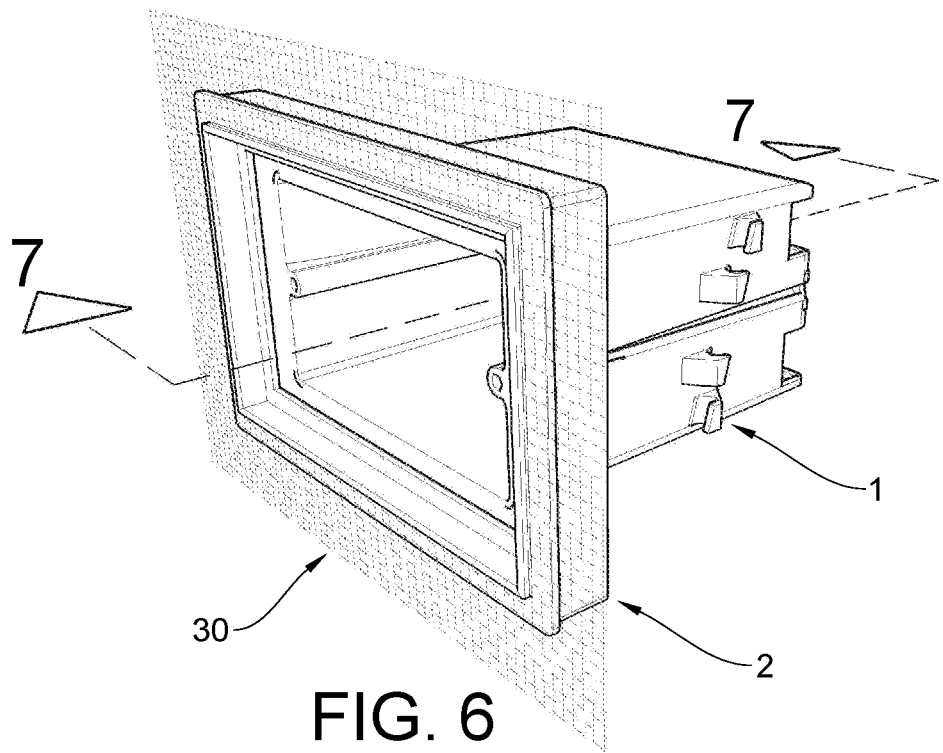
FIG. 6 is a perspective view of the flush wallplate electrical box and finish material interface flange defining section 7.
Figure 7:
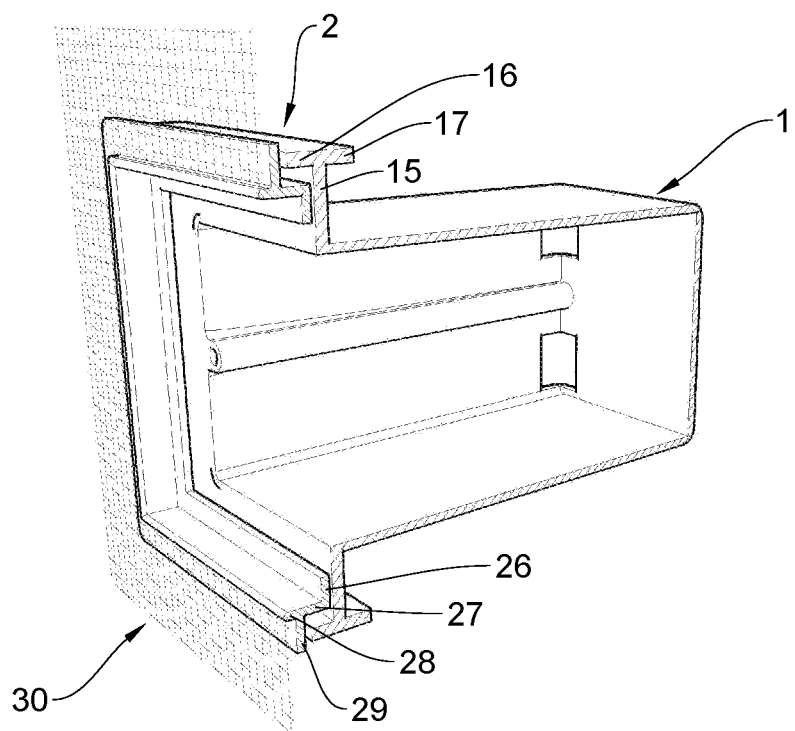
FIG. 7 is a perspective section of the flush wallplate electrical box and finish material interface flange.

Referring to FIGS. 5-7: The FWE Box can optionally be paired with a finish material interface flange (25), hereafter referred to as the interface flange. The interface flange (25) is formed in longitudinal and transverse dimensions that would permit nested placement inside of the FWE box wallplate housing and also provide a uniform distance between the electrical wallplate peripheral edge and wall assembly finish materials. The interface flange is comprised of four interface flange portions: a reveal back portion (26) parallel to the FWE box housing co-planar portion, a reveal side portion (27), a projection portion (28), a finish material abutment portion (29). It additionally includes an interface flange open face (31), sized to permit nested placement of the electrical wallplate.

The interface flange portions have the following attributes. First, the reveal back (26) and reveal side portions (27) provide a controlled distance and a finish material between the electrical wallplate and the wall finish material adjacent to the box. Second, the finish material abutment portion (29) provides a substrate for placement of wallboard joint compound fiberglass meshes (30) or paper tapes in the instance that the finish material is wallboard, as is typically the case. These meshes (30) or tapes serve to strengthen the bond between the wallboard and the interface flange. The meshes or tapes can be adhesively bonded to the abutment portion (29), as is presented and shown in FIGS. 6 and 7, or can be optionally omitted and the finish left to the wallboard finisher. The outside edge of the mesh or tape would be placed against the wallboard and joined to the wallboard using typical wallboard joining methods. Third, the flange projection (28) portion provides a projection which serves, again for wallboard installations, as a screed guide for wallboard joint compound to be applied to a consistent depth using wallboard finishing tools. The interface flange is thus connected to the wallboard by joint compound finishing. Optionally, the wallboard interface flange can be adhered to the wallboard using specialized spray adhesives intended for adhering wallboard finish trims to wallboard in order to facilitate steady joint compound finishing.

The wallboard interface flange is now mechanically connected to the wallboard. It should be noted that while the interface flange (25) is nested within the FWE Box wallplate housing (2), it is not adhesively or mechanically connected to either the FWE box, flush wallplate or outlet. This is by intent so as to isolate the wall assembly from the box and wallplate and thus help prevent cracking of the wall assembly finish materials due to outlet use or thermal expansion and contraction.

In the instance that the wall finish material is other than wallboard and the interface flange is used, the projection portion (28) portion serves as a stop for materials that abut the flange.

Figure 8:
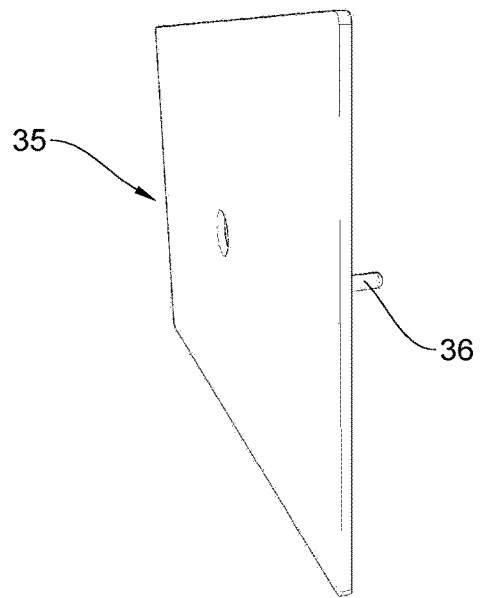
FIG. 8 is a perspective view of the wiring protection plate.
Figure 9:
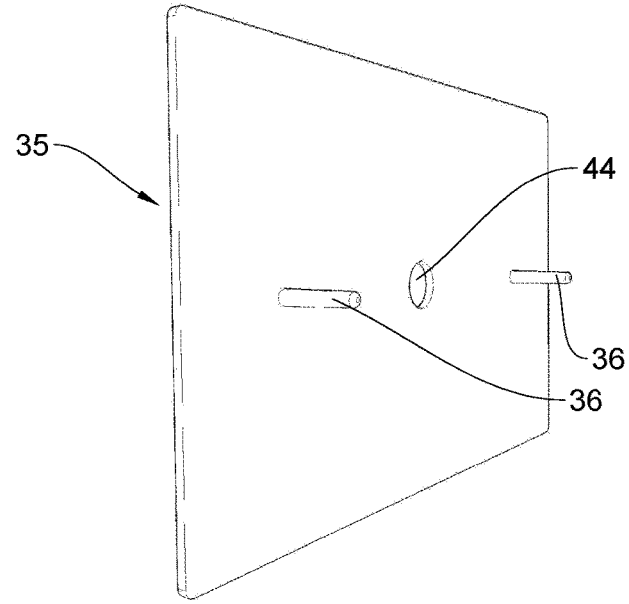
FIG. 9 is an alternate perspective view of the wiring protection plate.
Figure 10:
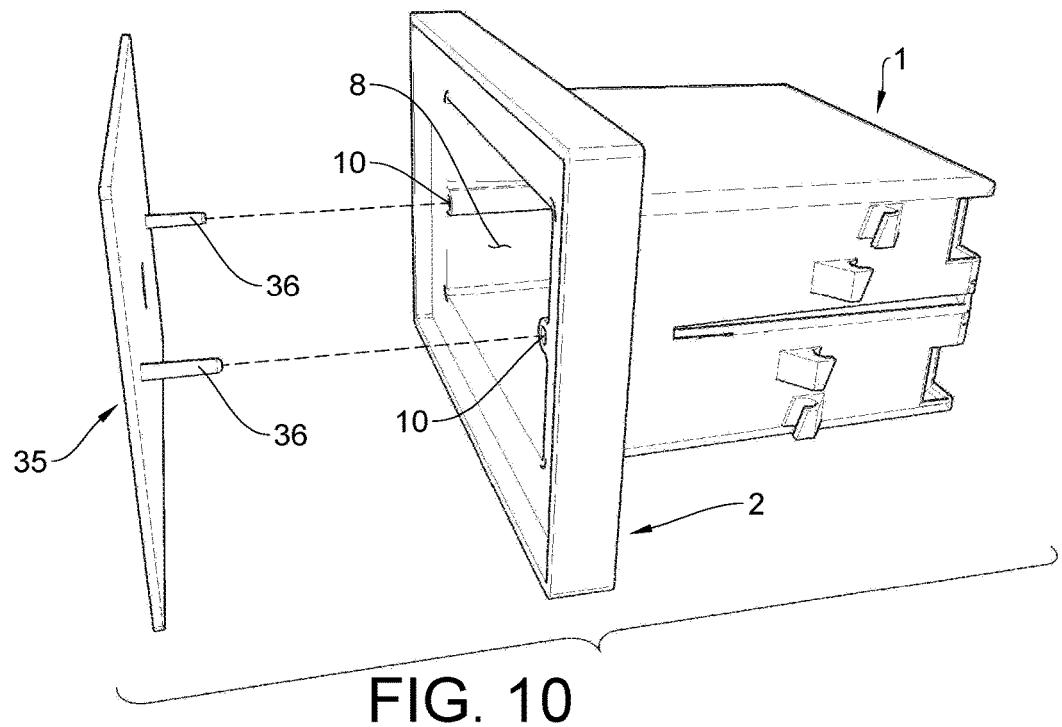
FIG. 10 is an exploded perspective view of the wiring protection plate and flush wallplate electrical box.

Referring to FIGS. 8-10: After FWE Box placement and installation of wiring but before placement of the finish material interface flange and electrical components, the presented wiring protection (35) plate is placed in the FWE box wallplate housing (2) and held in place by two plate guide portions (36) which are inserted into the box threaded recesses (10) intended for the outlet yoke attachment screws. The wiring protection plate (35) serves to protect wiring from wallboard router bits during wallboard installation. The plate guide portions (36) should be of such a size as to friction fit the threaded recesses and constructed of such a material that will not damage the internal threading intended to receive the outlet yoke screws. This wiring protection plate also serves an additional function related to finish material installation and is described here: for standard electrical boxes, wallboard installers using powered routers begin their cuts using plunge cuts followed by moving the router sideways until reaching the box periphery whereupon they pull the router back to go up and over the box side moving from inside the box to outside the box. From there, installers route typically counter-clockwise around the periphery of the box. The FWE Box wallplate housing may diminish the ability of wallboard installers to use this standard methodology. In contrast, an installation with the wiring protection plate place will give the wallboard installer similar cues as standard electrical boxes as to when to pull their routers back to go up and over the FWE Box housing wallplate portion. Again, the manner of typical construction is thus preserved.

Figure 11:
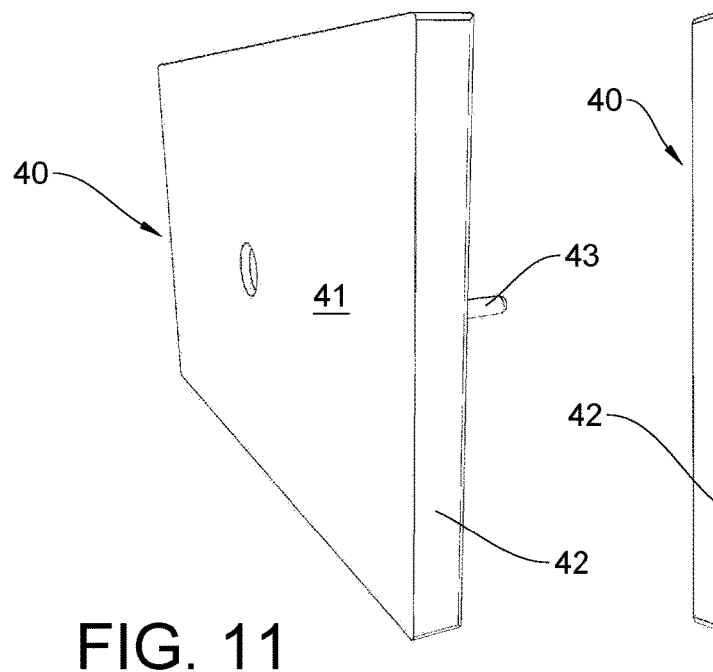
FIG. 11 is a perspective view of the finish material interface flange placement guide.
Figure 12:
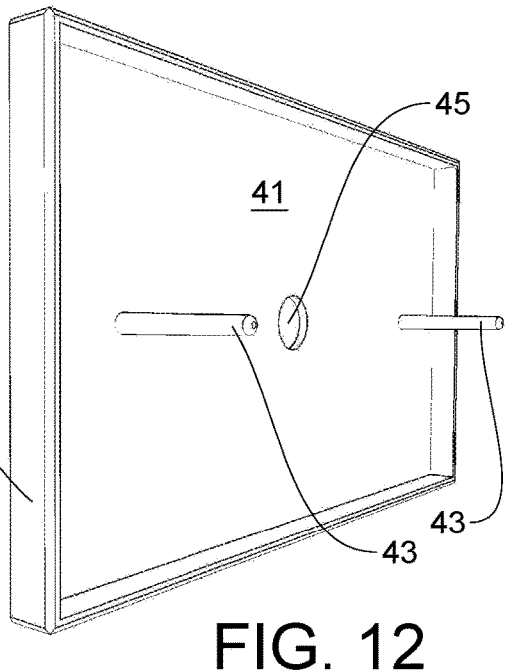
FIG. 12 is an alternate perspective view of the finish material interface flange placement guide.
Figure 13:
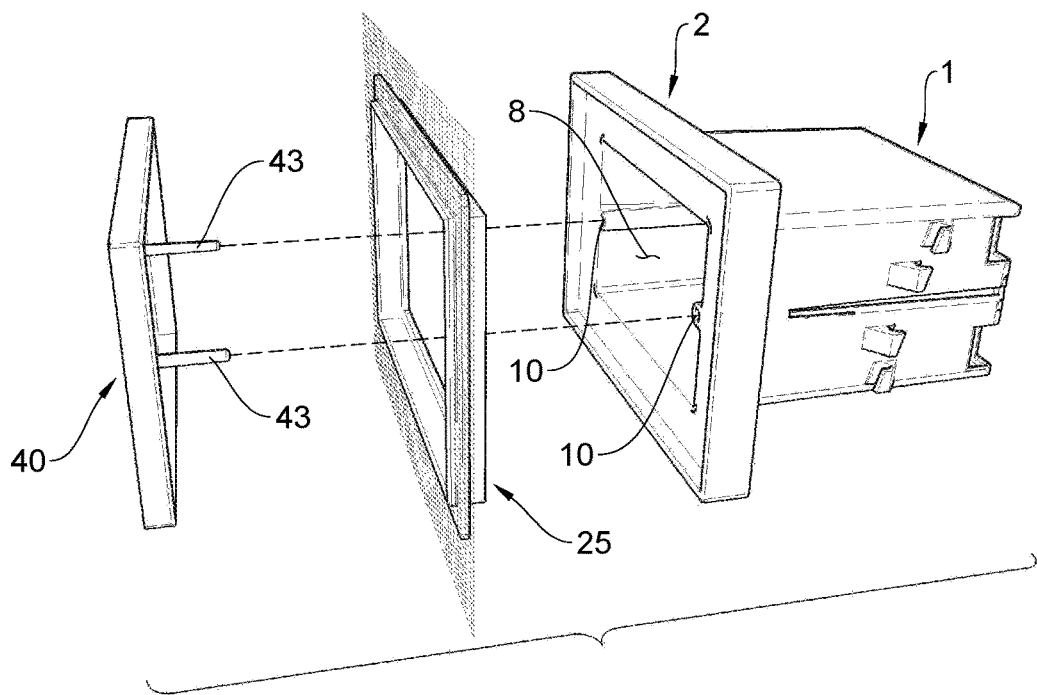
FIG. 13 is an exploded perspective view of the finish material interface flange placement guide, finish material interface flange and flush wallplate electrical box.

Referring to FIGS. 11-13: Because the measurement between the interface flange reveal side portion and wallplate (not shown here), typically referred to as the reveal, is critical, a finish material interface flange placement guide (40), is presented. This guide, hereafter referred to as the interface flange placement guide, serves to assure that the placement of the interface flange will be substantially accurate relative to the FWE Box and thus to the eventually placed wallplate. The guide is comprised of a flat portion (41) parallel to the open face of the box, a return portion (42) orthogonal to and integrally connected to the flat portion. When the return portion is placed against the FWE box housing co-planar portion, it assures that the flat portion is indeed placed parallel to the FWE box. Lastly, two flange placement guide portions (43) are to be inserted into the FWE Box threaded recesses (10). The wiring protection plate (35) will have been removed before placement of the interface flange. The interface flange placement guide (40) is nested into the interface flange (25) and provides for accurate placement of the interface flange in the FWE box wallplate housing (2). This guide is especially helpful given the fast-setting characteristics of wallboard trim adhesives should they be used. The interface flange placement guide (40) also serves to help prevent joint compound from entering the interface flange reveal and FWE box portion of the installation during wallboard finishing. Optional holes (44 FIG. 9, 45 FIG. 12) are placed in both the wring protection plate (35) and interface flange placement guide (40) to facilitate their removal prior to installation of electrical components.

Figure 14:
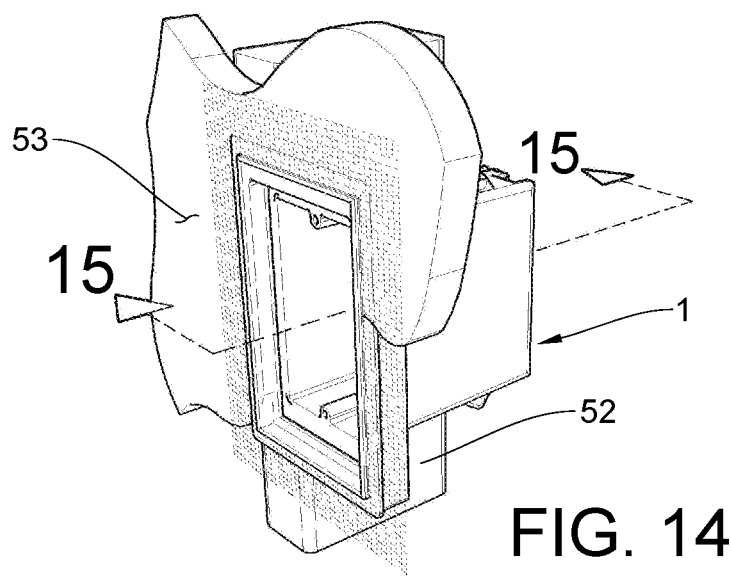
FIG. 14 is a perspective view of the flush wallplate electrical box and finish material interface flange placed in a wall assembly cut-away and defining section 15.
Figure 15:
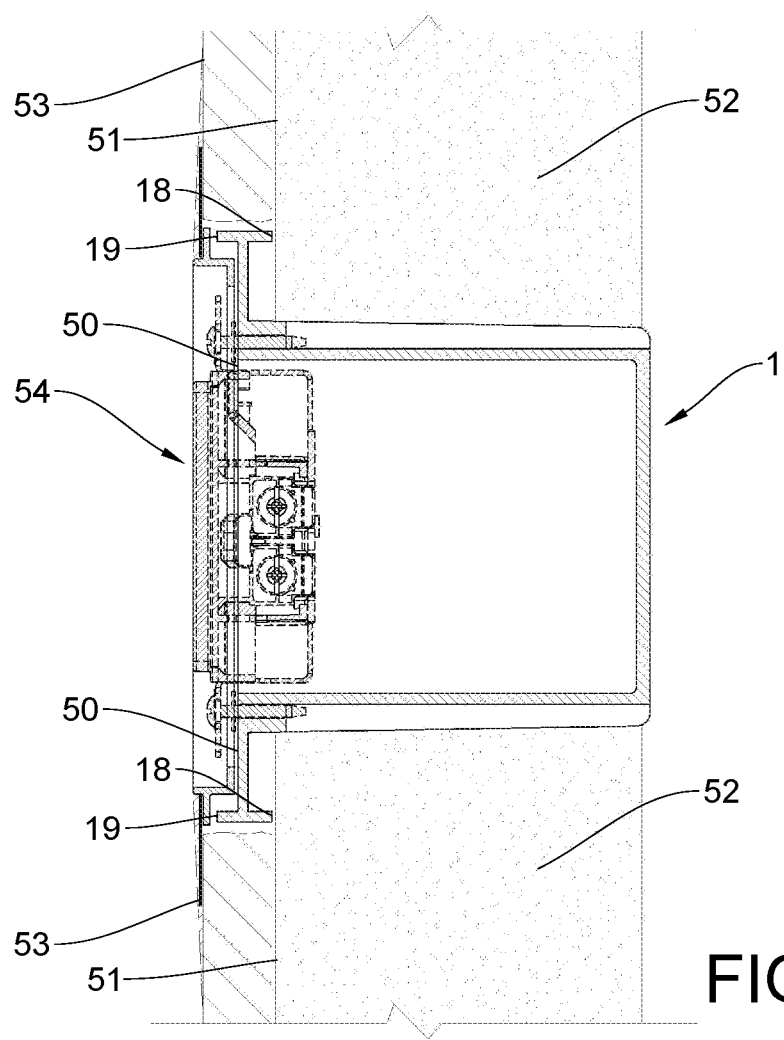
FIG. 15 is an orthographic section of the flush wallplate electrical box and finish material interface flange with a typical electrical receptacle placed.

Referring to FIGS. 14 and 15: Because the FWE box wallplate housing wallplate portion front edge (19) and calibration portion rear edge (18) are prescribed dimensions from the front edge of the electrical box body (50), the installing electrician does not need to measure the distance from the framing member (52) front edge (51) to the FWE box front edge (50) to assure proper box placement. Thus, these portions make the depth placement of the box self-calibrating for installing electricians. This facilitates quick, proper and consistent placement of electric boxes during new construction. Most importantly, the distance from the housing wallplate portion front edge (19) to the face of wall assembly finish material (53) is kept within the tolerances for complying with NEC 314.20. A typical electrical receptacle (54, in dashed lines), while not a part of this application, is shown attached to the FWE box to describe its position in this flush wallplate installation.

Figure 16:
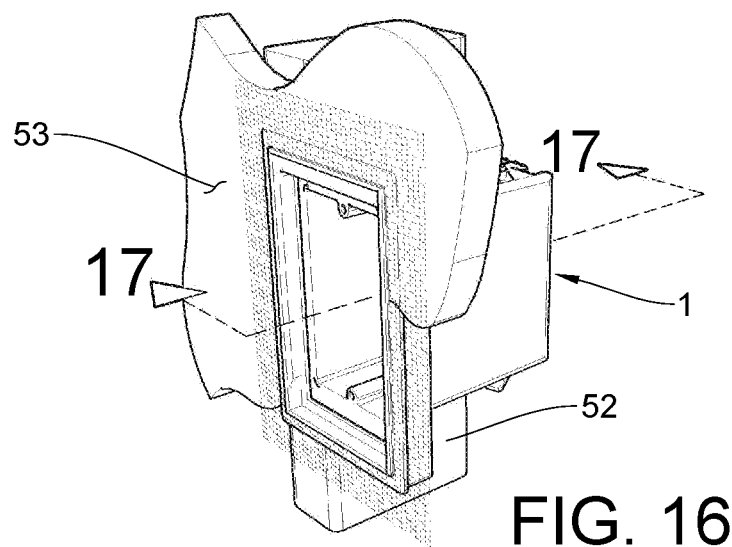
FIG. 16 is a perspective view of the flush wallplate electrical box and finish material interface flange placed in a wall assembly cut-away and defining section 17.
Figure 17:
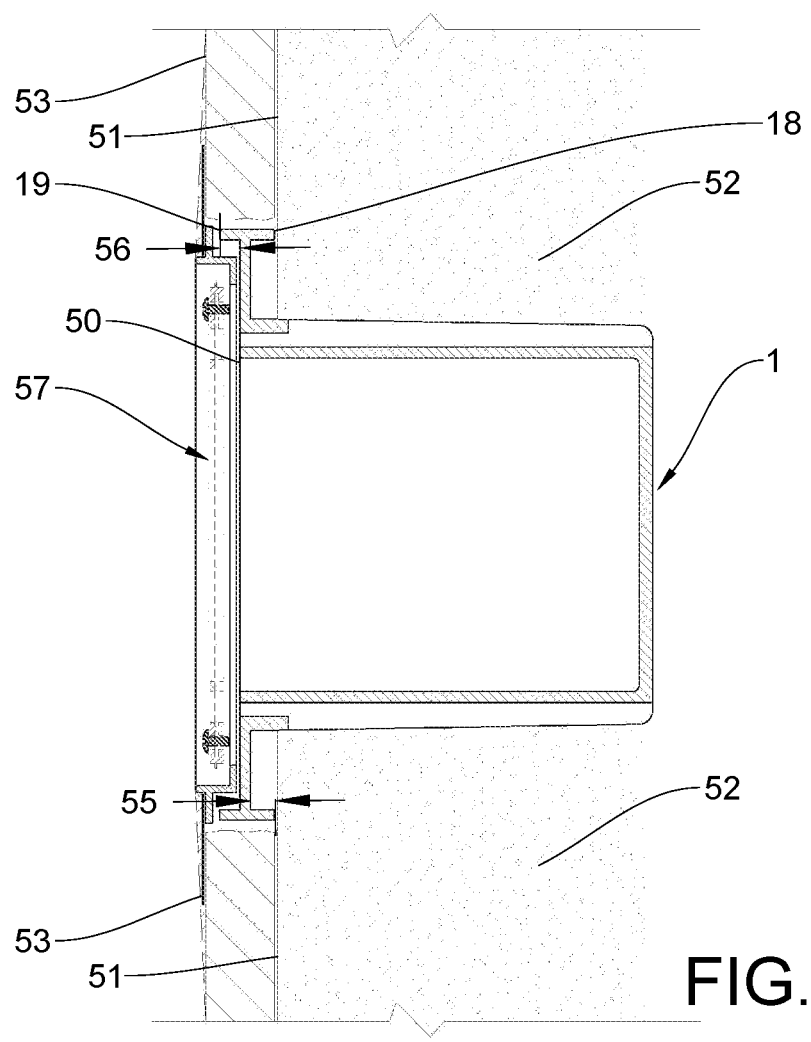
FIG. 17 is an orthographic section of the flush wallplate electrical box and finish material interface flange with typical screwless wallplate subplate placed.

Referring to FIGS. 16 and 17: The FWE box housing calibration portion longitudinal dimension (55) will be sized according to finish material thickness; in the case of wallboard, the calibration portion can be sized to provide the claimed result for either 5/8 or ½ inch thicknesses as non-limiting examples. The housing wallplate portion longitudinal portion dimension (56) is sized according to the depth required for standard wallplates and, in the case of screwless wallplates, a subplate, plus an adjustment margin. Here a standard flush wallplate subplate (57, in dashed lines), while not part of this installation, is shown as it would be placed if attached to the outlet yoke to describe its position in this flush wallplate installation.

Figure 18:
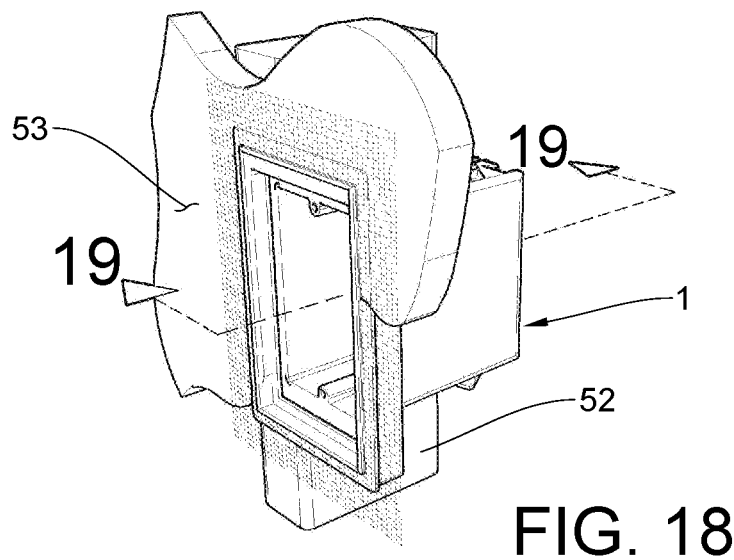
FIG. 18 is a perspective view of the flush wallplate electrical box and finish material interface flange placed in a wall assembly cut-away and defining section 19.
Figure 19:
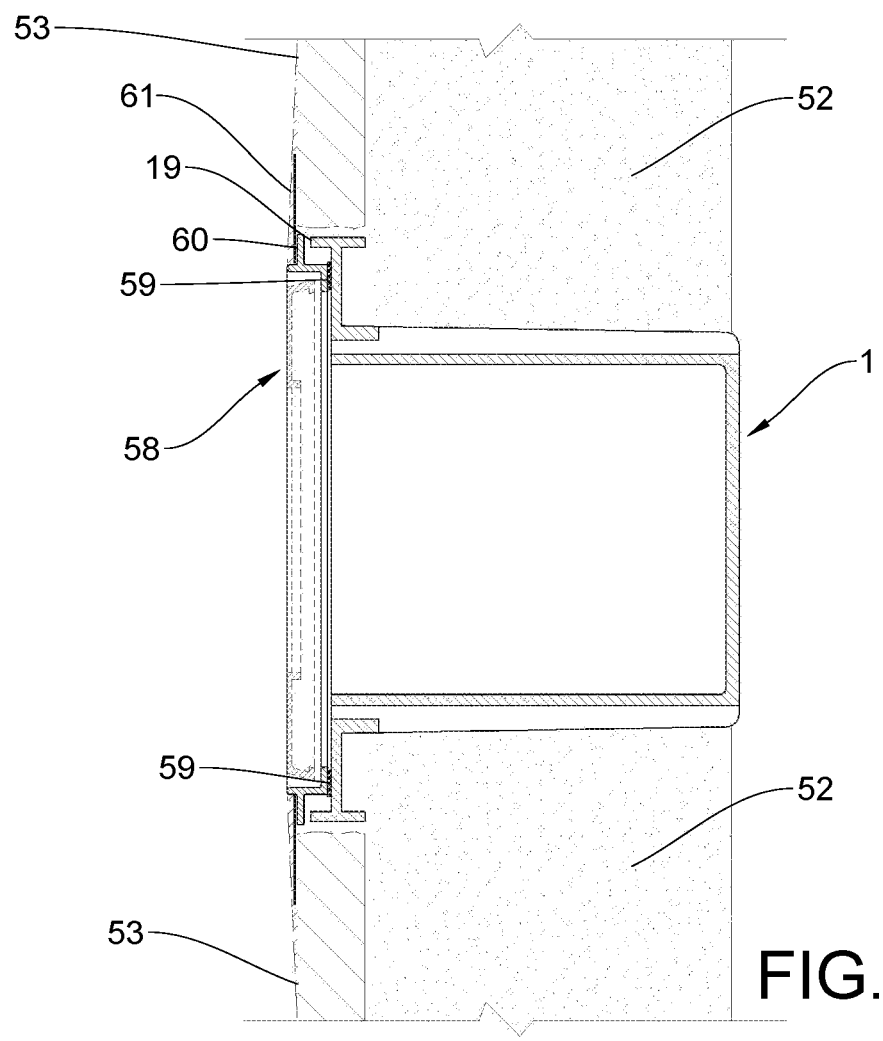
FIG. 19 is an orthographic section of the flush wallplate electrical box and finish material interface flange with typical screwless wallplate placed.

Referring to FIGS. 18 and 19: The flush wallplate (58, in dashed lines), not part of this application, is shown in its installed position-substantially co-planar with the wall assembly finish material finish face (53) as is desired. While the flush wallplate, subplate and receptacle are shown in separate figures (FIGS. 19, 17, 15) for visual clarity, their position in the figures is accurate relative to the FWE box and interface flange. Also shown here is the interface flange finish material abutment portion front surface (60) is substantially co-planar to the face of wall assembly finish material (53). This is enabled by the FWE box wallplate portion front edge (19) being set back from the finish material face (53) within tolerances allowed by code. The wallboard finish mesh plus joint compound projection (61) from the plane of the wall assembly is thus minimized producing a flatter wall surface in proximity to the FWE box.

Referring to FIGS. 15, 17 and 19: The interface flange serves as a substrate for placement of foam sealing tapes or gaskets (59) which together with the FWE box housing provide for tight air sealing. This flange sealing method also eliminates the use of messy and laborious putties or spray foam in the wallboard cutout area. Note the gasket is shown compressed and is referenced only in FIG. 19.

Figure 20:
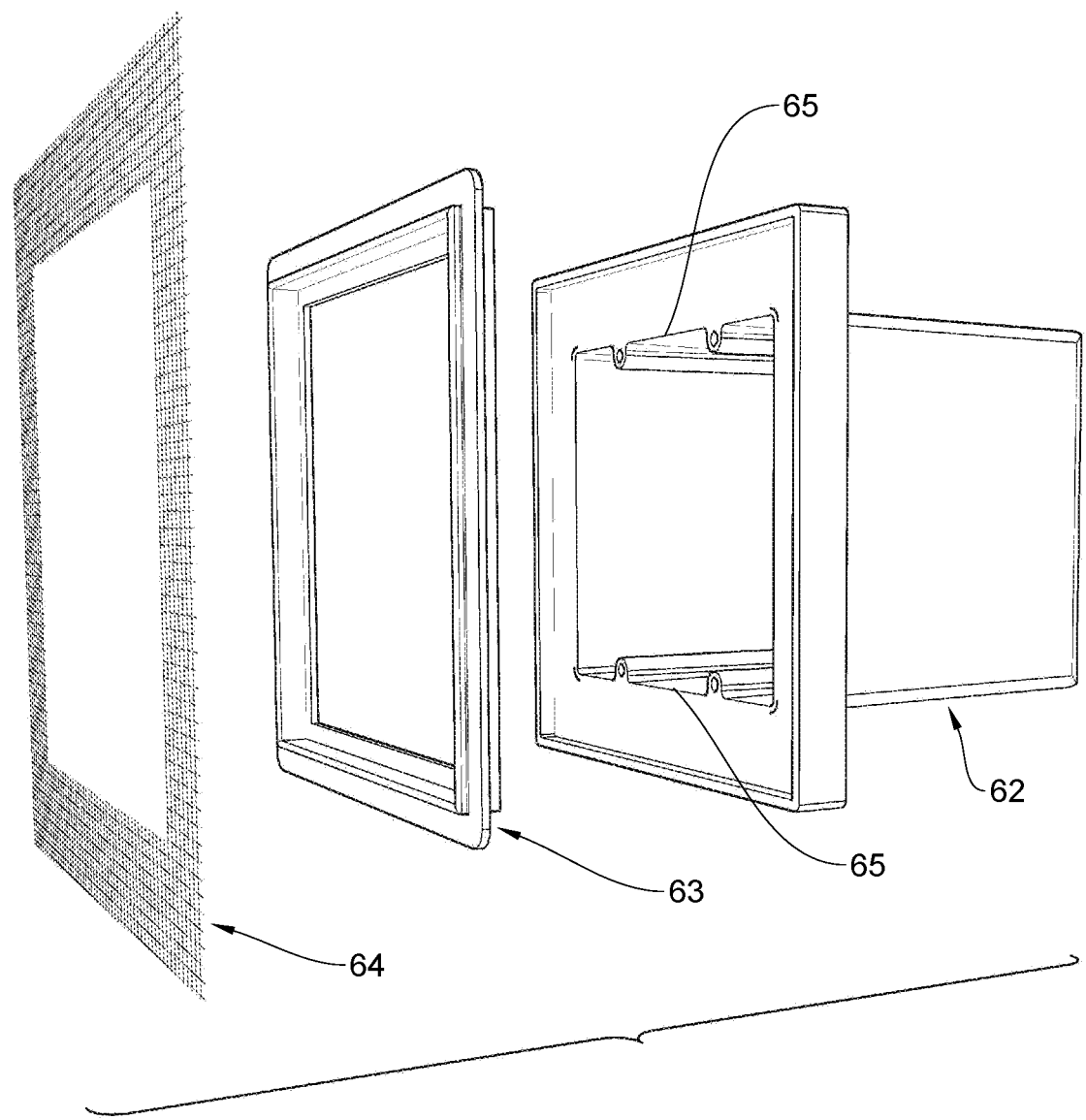
FIG. 20 is an exploded perspective view of the flush wallplate electrical box and finish material interface flange two "gang" box embodiment.

Referring to FIG. 20: A two "gang" embodiment of the FWE box (62) and finish material interface flange (63) with wallboard finishing mesh (64) are shown as representative of the adopting the structures, proportions and configurations to multi-"gang" embodiments. The base sides (65) of multi "gang" boxes are defined as the sides whereby outlets mounted to the box using the threaded recesses are oriented vertically after installation and may be inverted at installers option.

Figure 21:
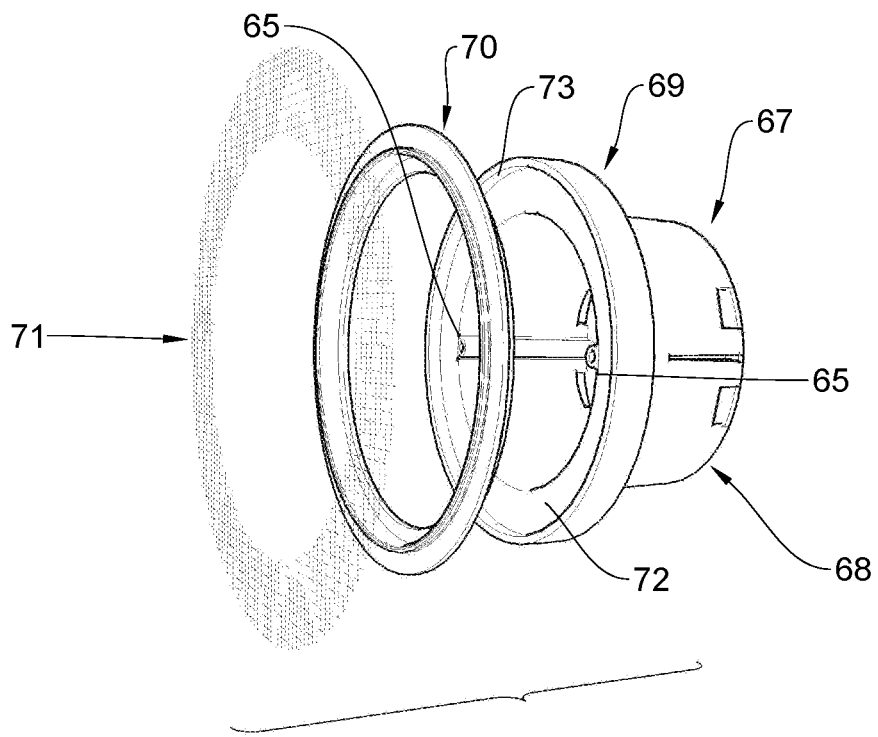
FIG. 21 is an exploded perspective view of the flush wallplate electrical box-round embodiment and round finish material interface flange.
Figure 22:
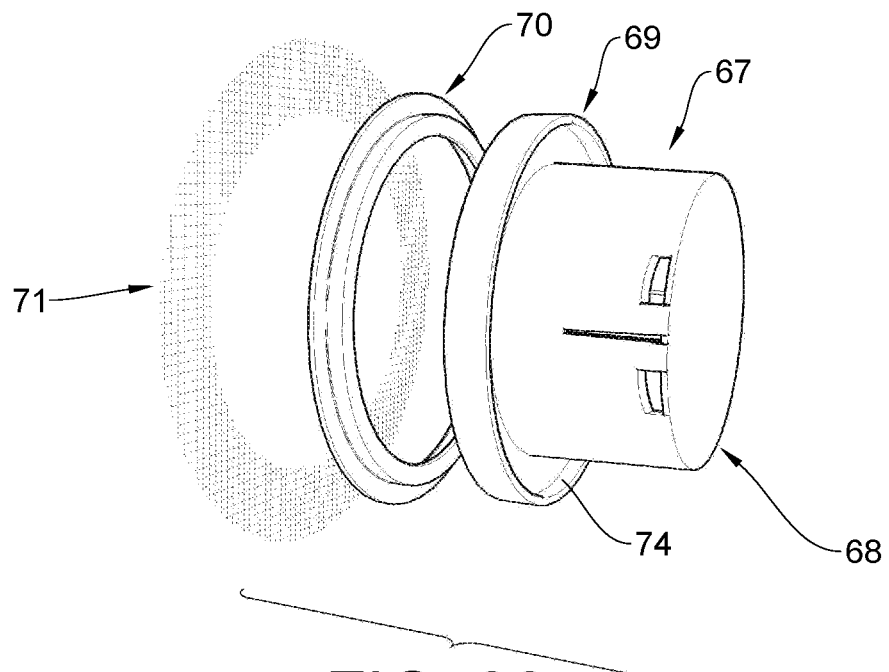
FIG. 22 is an alternative exploded perspective view of the flush wallplate electrical box-round embodiment and round finish material interface flange.

Referring to FIGS. 21 and 22: A round embodiment (67) of the FWE box comprised of a round body structure (68) and round wallplate housing (69), round finish material interface flange (70) and a round wallboard finishing mesh (71) are shown as representative of the adopting the structures, proportions and configurations to round embodiments. Also referenced are the round co-planar portion (72), round wallplate portion (73) and round calibration portion (74). The base sides (65) of such boxes are defined as the sides whereby outlets mounted to the box threaded recesses are oriented vertically and luminaires mounted to the box are oriented vertically or horizontally after installation and may be inverted or rotated at installers option.

Figure 23:
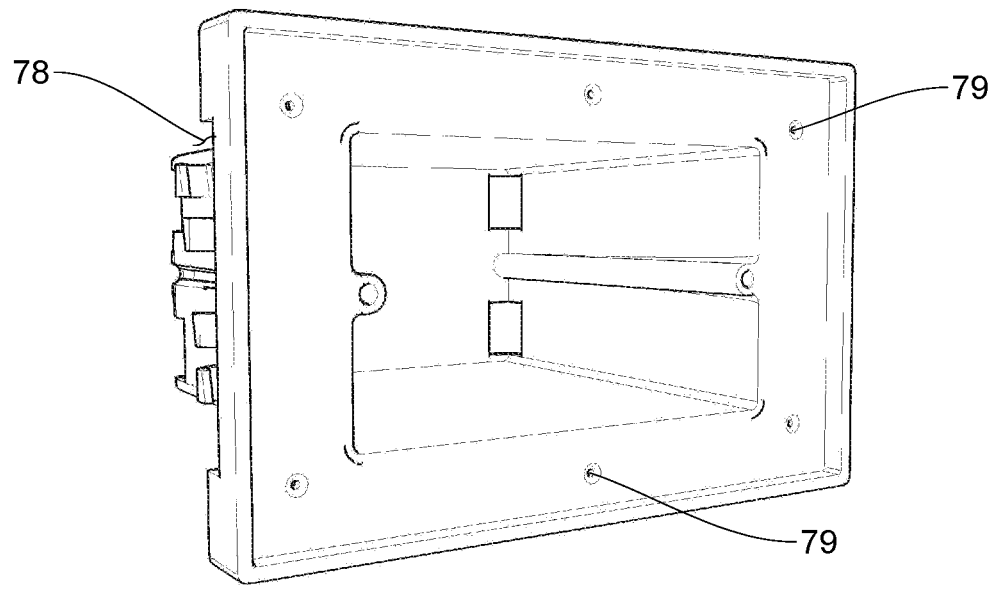
FIG. 23 is a perspective view of the flush wallplate electrical box-modified calibration portion embodiment.
Figure 24:
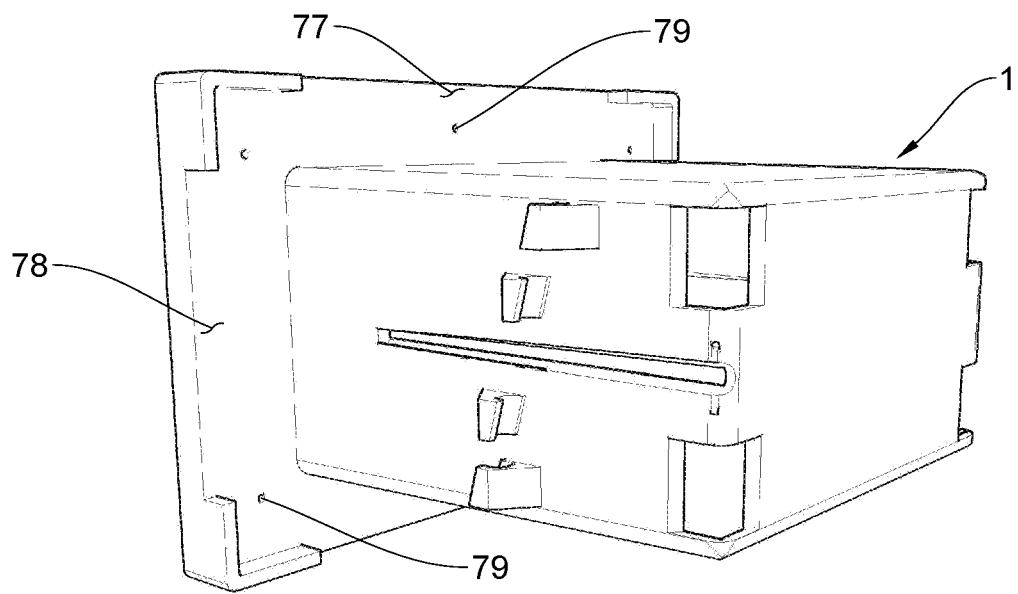
FIG. 24 is an alternate perspective view of the flush wallplate electrical box-modified calibration portion embodiment.

Referring to FIGS. 23 and 24: The flush wallplate electrical box housing calibration portion has been modified in longitudinal (77) and transverse (78) portions of the FWE box housing. It is shown as a non-limiting example of possible modifications to the calibration portion. Additionally, optional fastening openings (79) in the wallplate housing co-planar portion permit fastening to framing from the front of the FWE box wallplate housing using either screws or nails. These fastening openings can be formed on any of the FWE boxes disclosed in this application. The openings can optionally further possess a countersunk portion on the front face of the co-planar portion to accommodate the head of the fastener. The fastening openings can be in lieu of the fastening clips or in addition to the fastening clips to provide optionality to the installer. The use of the fastening openings to fasten the box to wall assembly framing with screws permits some measure of adjustability after the wallboard has been placed but before the interface flange has been placed.

The fastening openings (79) in the wallplate housing co-planar portion permit the FWE box to be used for old work type installations. After a hole of a size to match the wallplate housing is cut in wall finish material such as wallboard, the FWE box can be fastened to wall assembly framing using fasteners from the front of the box.

Figure 25:
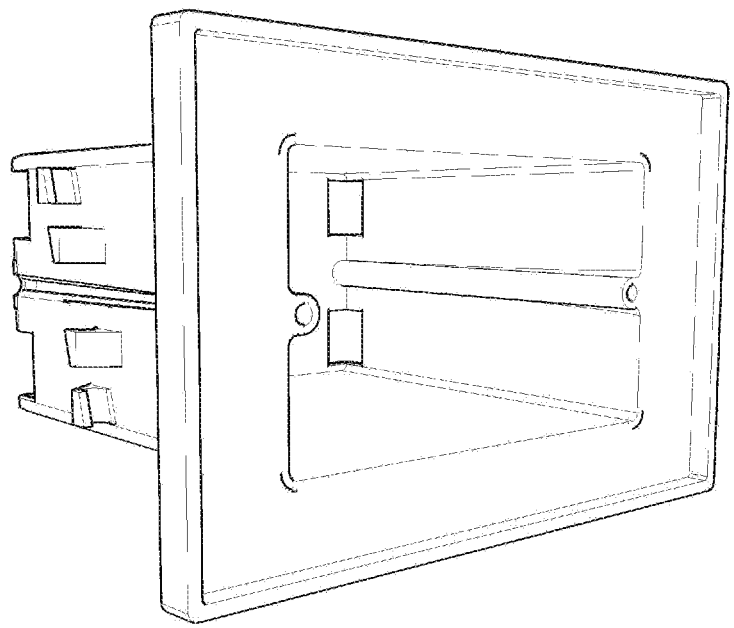
FIG. 25 is a perspective view of the flush wallplate electrical box-calibration portion removed embodiment.
Figure 26:
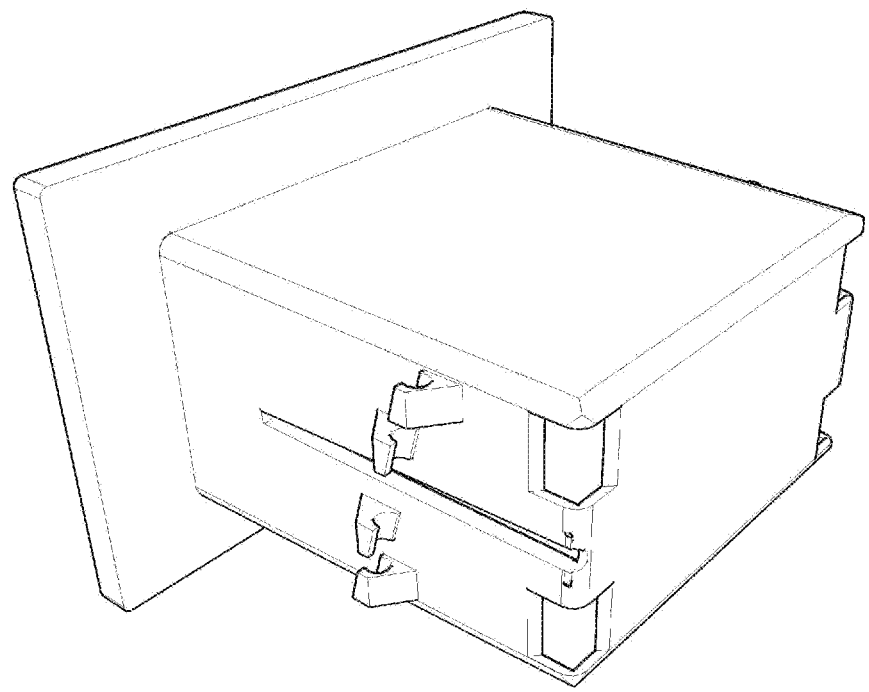
FIG. 26 is an alternate perspective view of the flush wallplate electrical box-calibration portion removed embodiment.

Referring to FIGS. 25 and 26: In the instance of wall assembly finish materials that have a thickness less than standard sizes, typically less than ⅜", the flush wallplate electrical box housing calibration portion can been omitted in its entirety.

Figure 27:
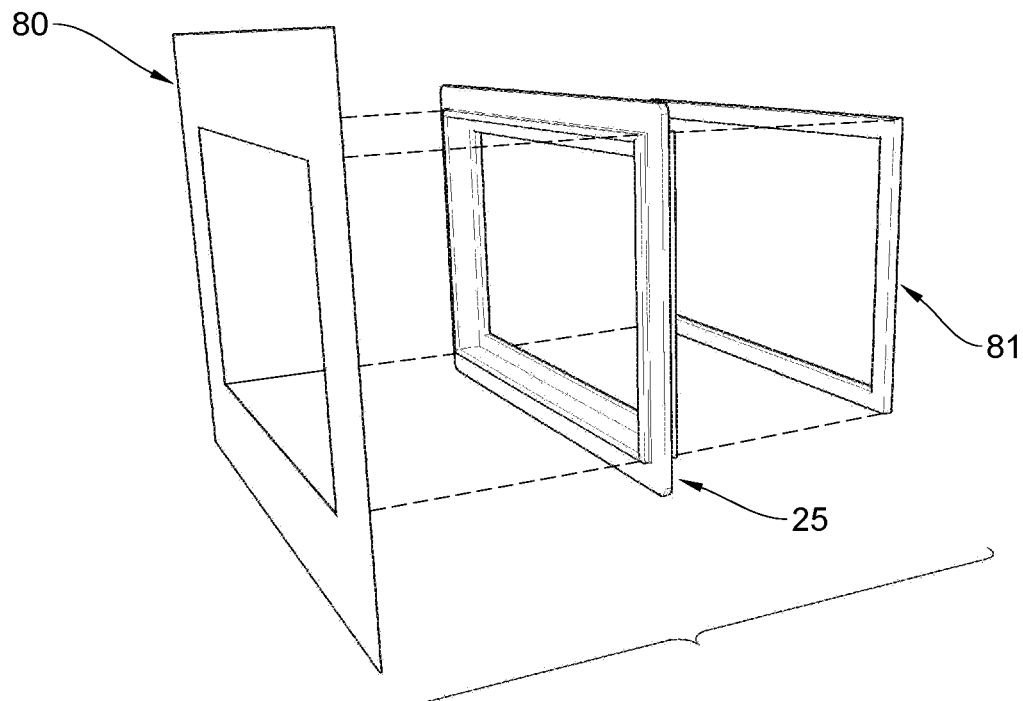
FIG. 27 is an exploded perspective view of the finish material interface flange with paper tape in lieu of mesh and receiving an air sealing gasket.
Figure 28:
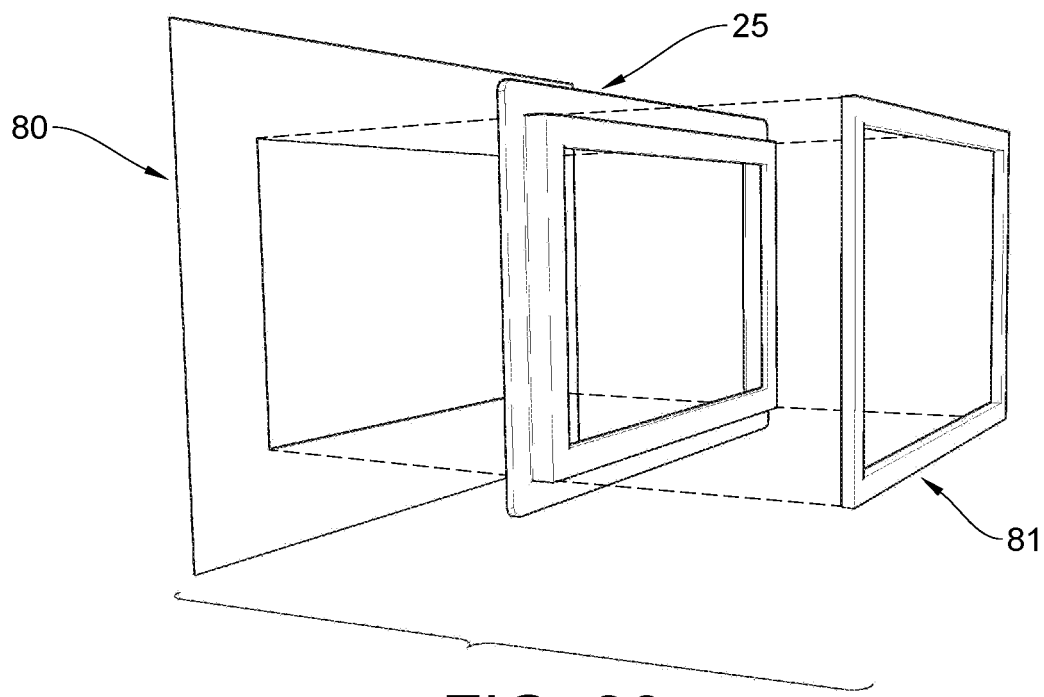
FIG. 28 is an alternative exploded perspective view of the finish material interface flange with paper tape in lieu of mesh and receiving an air sealing gasket.

Referring to FIGS. 27 and 28: The finish material interface flange is shown with standard wallboard finishing paper tape (80) now being paired to the interface flange (25) for wallboard finishing. The interface flange (25) is also shown as a substrate for an air sealing gasket (81) shown in its uncompressed state.

Means and methods of manufacture: the flush wallplate electrical box, wiring protection plate and finish material interface flange placement guide can be manufactured using currently available precision plastic injection mold manufacturing methods as well as multi component injection molding (such as double shot molding and overmolding). They are formed into the shapes shown in FIGS. 1-28 from typical thermoplastic materials including but not limited to polycarbonate, PVC, PPE blends or fiber reinforced polyester as non-limiting examples. Higher strength plastics including but not limited to PPS (polyphenylene) or polyamideimide (PAI) using single shot or other molding techniques may be used, again as non-limiting examples, to provide requisite rigidity, strength and durability. Regardless of the selected material, the general proportional and shape constraints between portions of the assembly apply.

The manufacturing materials used should provide and enclosures have the required National Electrical Manufacturers Association grades and should comply with the appropriate UL fire resistance classification.

The finish material interface flange can be made of nylon-based engineering grade polymer thermoplastics or thermoset plastics as non-limiting examples so as to substantially complement the placed electrical components such wallplates, receptacles and switches.

With respect to the manufacturing and assembly methods, the presented materials and methods of fabrication and the steps and order of steps are exemplary in nature and therefore not necessary or critical. Other ways are also contemplated including but not limited to substituting materials of fabrication.

The detailed description and appended drawings describe and illustrate various exemplary embodiments of the invention. Each demonstrates non-limiting examples of construction and use while possessing characteristics of the invention. The description and drawings are not intended to limit the scope of the invention in any manner and the methods disclosed are representative of non-limiting applications.

What is claimed is:

1. A flush wallplate electrical box for placement in wall, ceiling or floor assemblies, the box comprising:
    a substantially rectangular body structure comprised of four sides joined together at a plurality of edges, a body back portion integrally and substantially connected to a rectangular body structure first distal edge and a body structure open face at a rectangular body structure second distal edge; and
    a wallplate housing integrally connected to the rectangular body structure and configured to receive an electrical wallplate, said wallplate housing comprising:
        a co-planar portion integrally connected to the rectangular body structure where the rectangular body structure meets the rectangular body structure second distal edge and extending outwardly therefrom;
        a calibration portion orthogonal to and integrally connected to a co-planar portion distal periphery and extending from the co-planar portion toward the body back portion; and
        a wallplate portion orthogonal to and integrally connected to the co-planar portion distal periphery and oppositely arranged to the calibration portion.

2. The flush wallplate electrical box of claim 1 wherein, a wallplate housing calibration portion edge having a prescribed dimension from the co-planar portion and, a wallplate housing wallplate portion edge having a prescribed dimension from the co-planar portion, the wallplate housing wallplate portion edge is substantially disposed a distance from a wall, ceiling or floor assembly finish material finished surface equal to or less than that required by relevant building and/or electrical code for the distance when the wallplate housing calibration portion edge is placed against wall, ceiling or floor assembly framing materials.

3. The flush wallplate electrical box of claim 1 wherein, the wallplate housing calibration portion edge having the prescribed dimension from the co-planar portion and, the wallplate housing wallplate portion edge having the prescribed dimension from the co-planar portion, an electrical wallplate finished face is substantially disposed co-planar to the wall, ceiling or floor assembly finish material finished surface when the calibration portion edge is placed against wall, ceiling or floor assembly framing materials.

4. The flush wallplate electrical box of claim 1 further comprised of a threaded recess for purposes of receiving an electrical outlet device mounting screw placed at the inside of each of both transverse sides for single outlet boxes and of a plurality of threaded recesses placed at the inside of the base side and a like number oppositely arranged within the body structure for multiple outlet boxes.

5. The flush wallplate electrical box of claim 1 wherein a plurality of openings are placed on the wallplate housing co-planar portion to receive fasteners and permit fastening said box to wall, ceiling or floor assembly framing materials.

6. The flush wallplate electrical box of claim 1 wherein the wallplate housing is configured to receive a rectangular wiring protection plate, said wiring protection plate comprising a plate face portion configured to be received in a nested manner by the wallplate housing and further comprising a plurality of substantially cylindrical plate guide portions to be received by the flush wallplate threaded recesses and so disposing and retaining said protection plate to the wallplate housing co-planar portion.

7. The flush wallplate electrical box of claim 1 wherein a plurality of fastener clips are placed on the outside of either or both transverse sides of the rectangular body structure to receive fasteners and permit said electrical box fastening to wall, floor or ceiling framing materials.

8. The flush wallplate electrical box of claim 1 wherein a plurality fastener channels are formed on either or both transverse sides of the rectangular body structure to receive fasteners and permit fastening said electrical box to wall, floor or ceiling framing materials.

9. The flush wallplate electrical box of claim 1 wherein a plurality of knockouts and/or openings are placed in the rectangular body structure and/or the body back portion to allow cabling or wiring to enter the box and/or be secured to the box.

10. The flush wallplate electrical box of claim 1 wherein the rectangular body structure tapers from the rectangular body structure second distal edge to the rectangular body structure first distal edge.

11. A flush wallplate electrical box for placement in wall, ceiling or floor assemblies, the box comprising:
    a substantially circular body structure comprised of a cylinder, a circular body back portion integrally and substantially connected to a circular body structure first distal edge and a circular body structure open face at a circular body structure second distal edge; and a round wallplate housing integrally connected to the circular body structure and configured to receive a round electrical wallplate, said round wallplate housing comprising:

a round co-planar portion integrally connected to the circular body structure where the circular body structure meets the circular body structure second distal edge and extending outwardly therefrom;

a round calibration portion orthogonal to and integrally connected to a round co-planar portion distal periphery and extending from the round co-planar portion toward the circular body back portion; and a round wallplate portion orthogonal to and integrally connected to the round co-planar portion distal periphery and oppositely arranged to the round calibration portion.

12. The flush wallplate electrical box of claim 11 wherein, a round wallplate housing calibration portion edge having a prescribed dimension from the round co-planar portion and, a round wallplate housing wallplate portion edge having a prescribed dimension from the round co-planar portion, the round wallplate housing wallplate portion edge is substantially disposed a distance from the wall, ceiling or floor assembly finish material finished surface equal to or less than required by relevant building and/or electrical code for the distance when the round wallplate housing calibration portion edge is placed against wall, ceiling or floor assembly framing materials.

13. The flush wallplate electrical box of claim 11 wherein, the round wallplate housing calibration portion edge having the prescribed dimension from the round co-planar portion and, the round wallplate housing wallplate portion edge having the prescribed dimension from the round co-planar portion, a round electrical wallplate finished face is substantially disposed co-planar to the wall, ceiling or floor assembly finish material finished surface when the round calibration portion edge is placed against wall, ceiling or floor assembly framing materials.

14. The flush wallplate electrical box of claim 11 further comprised of a threaded recess for purposes of receiving an electrical outlet device mounting screw placed at a base location on the inside of the circular body structure and another threaded recess oppositely arranged within the circular body structure.

15. The flush wallplate electrical box of claim 11 wherein a plurality of openings are placed on the round wallplate housing co-planar portion to receive fasteners and permit fastening said box to wall, ceiling or floor assembly framing materials.

16. The flush wallplate electrical box of claim 11 wherein the flush wallplate electrical box round wallplate housing is configured to receive a round wiring protection plate, said round wiring protection plate comprising a plate face portion configured to be received in a nested manner by the round wallplate housing and further comprising a plurality of substantially cylindrical plate guide portions to be received by the flush wallplate electrical box threaded recesses and so disposing and retaining said round wiring protection plate to the round wallplate housing co-planar portion.

17. The flush wallplate electrical box of claim 11 wherein a plurality of fastener clips are placed on the outside of the circular body structure to receive fasteners and permit said electrical box fastening to wall, floor or ceiling framing materials.

18. The flush wallplate electrical box of claim 11 wherein a plurality of fastener channels are placed on the circular body structure or placed on a planar element joined to the circular body structure either so as to receive fasteners and permit fastening said electrical box to wall, floor or ceiling framing materials.

19. The round flush wallplate electrical box of claim 11 wherein a plurality of knockouts and/or openings are placed in the circular body structure and/or the circular body back portion to allow cabling or wiring to enter the box and/or be secured to the box.

20. The round flush wallplate electrical box of claim 11 wherein the circular body structure tapers from circular body structure second distal edge to the circular body structure first distal edge.

\* \* \* \* \*